Figure 1:
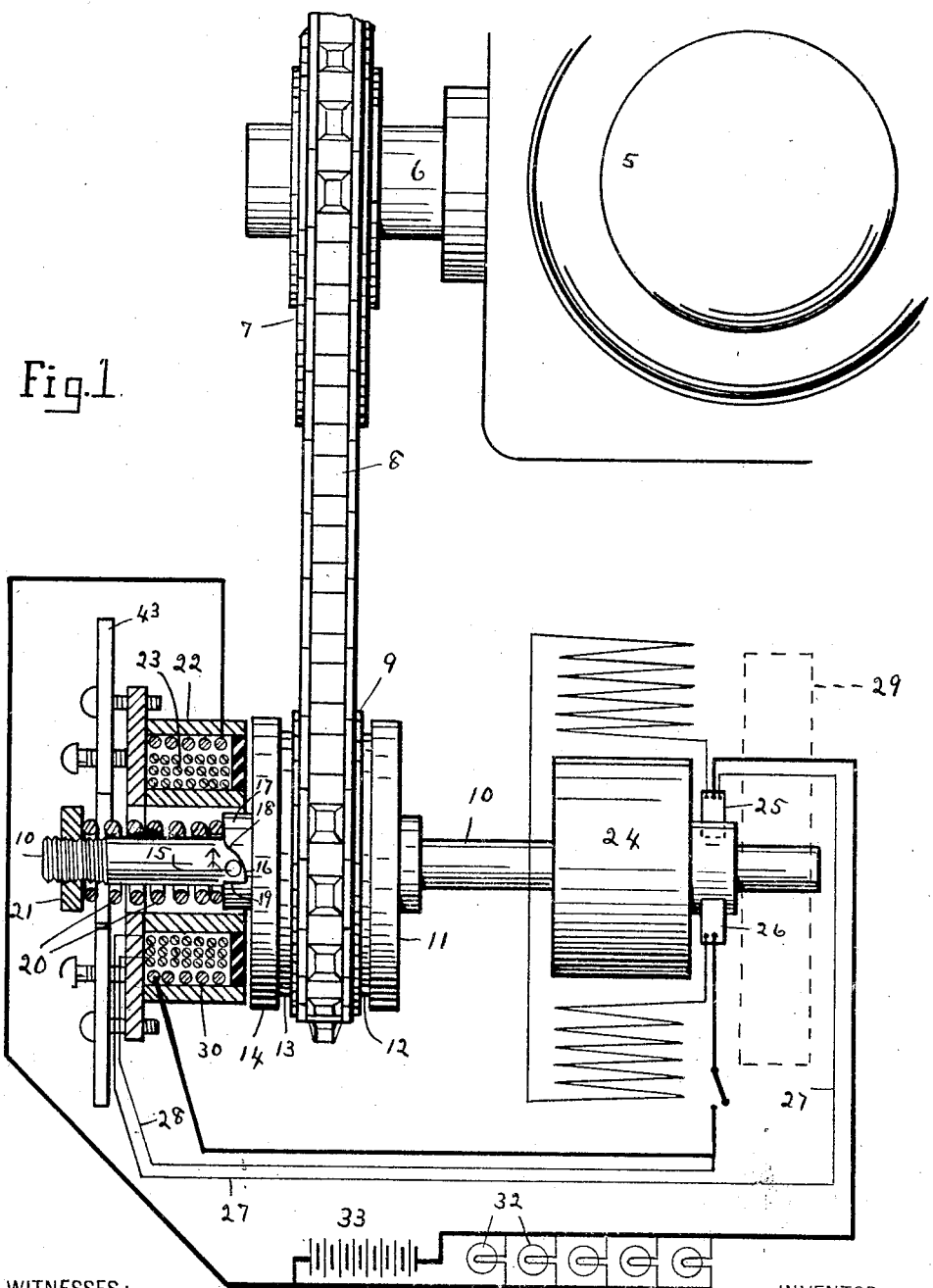

M. H. JOHNSON.
TRANSMITTER.
APPLICATION FILED DEC. 13, 1912.

1,236,568.

Patented Aug. 14, 1917.
2 SHEETS—SHEET 1.

WITNESSES:
James E. Brewer
Harriet Williams

INVENTOR
Montgomery H. Johnson
BY Martin & Jones
ATTORNEYS

M. H. JOHNSON.
TRANSMITTER.
APPLICATION FILED DEC. 13, 1912.
1,236,568.
Patented Aug. 14, 1917.
2 SHEETS—SHEET 2.
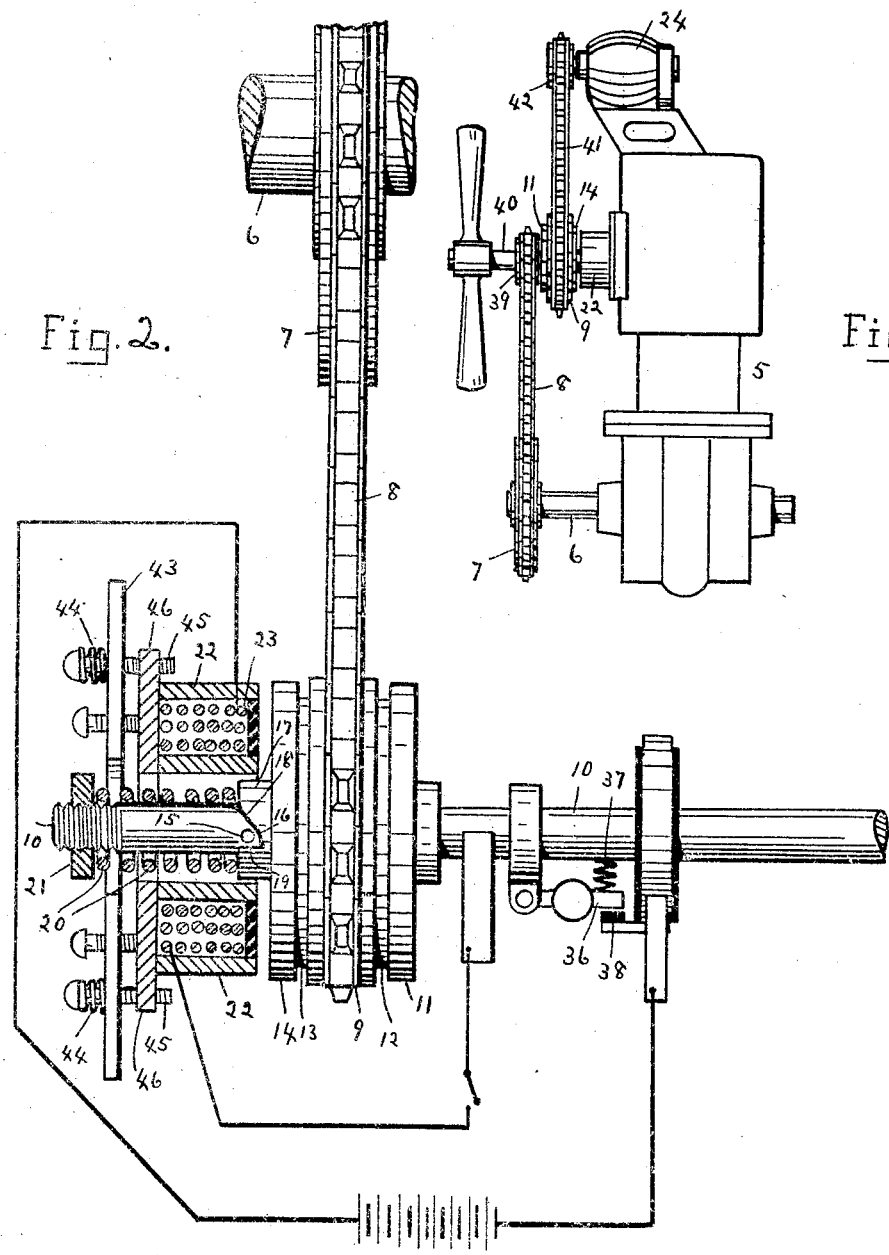
WITNESSES:
James E. Brewer
Harriet Williams.
INVENTOR
Montgomery H. Johnson
BY Martin & Jones
ATTORNEYS

UNITED STATES PATENT OFFICE.

MONTGOMERY H. JOHNSON, OF UTICA, NEW YORK.

TRANSMITTER.

1,236,568.   Specification of Letters Patent.   Patented Aug. 14, 1917.

Application filed December 13, 1912. Serial No. 736,460.

*To all whom it may concern:*

Be it known that I, MONTGOMERY H. JOHNSON, of Utica, in the county of Oneida and State of New York, have invented certain new and useful Improvements in Transmitters; and I do hereby declare that the following is a full, clear, and exact description thereof, which will enable others skilled in the art to which it appertains to make and use the same, reference being had to the accompanying drawings, and to the reference-numerals marked thereon, which form part of this specification.

One purpose of my invention is to provide a transmission device mechanically connecting a driving element to a driven element and adapted to control the speed of the latter in a predetermined manner.

Another purpose is to provide a transmission device mechanically connecting a prime mover to an electrical machine and adapted to regulate the speed and output of the electrical machine in a predetermined manner; such a device is adapted to utilize the variable speed of the prime mover to produce from the electrical machine a constant speed or output or a speed or output varying in a desired way; also to utilize the constant speed of the prime mover to obtain either a constant or a varying speed or output in the electrical machine as may be desired.

Another object of my invention is to provide a transmitter that will so connect two movable members that when the first is driving the second, the speed of the second may be controlled in a predetermined manner but when the second member is driving the first, the movement will be communicated without loss or at a fixed ratio.

A further purpose of my invention is to provide a transmitter which will connect a prime mover to an electric machine so as to automatically regulate the latter as to its speed, or output, and will also mechanically connect the electrical machine when operated as a motor to the former prime mover which is now to be the driven member. An example of the use to be made of such a device is that of an internal combustion engine being connected to a dynamo which may when desired be used as a motor to start the engine.

Ordinarily the ratio of speed between the engine and the dynamo is not the same as that desired between the engine and the same machine when used as a motor. This has heretofore necessitated two connections between the engine and the motor-dynamo, one connection being operative when the engine is driving and the other connection operative when the engine is driven. When a single fixed ratio of gearing is used between engine and motor-dynamo if the ratio is well suited to the action of the dynamo say 5 or 6 to 1 the motor dynamo must be very large and heavy in order to turn the engine over when starting. Sometimes this is overcome in a measure by applying relatively high voltage to the motor for starting but this introduces very complicated connections and apparatus.

Should a single fixed gear ratio best adapted to starting the engine be used it must be of the order of 15 or 30 to 1 if the size of the motor dynamo is not greater than is necessary to charge the battery and operate lights, etc. Such a gear ratio would cause the motor-dynamo to run at a destructive speed when the engine was running normally.

To obviate these difficulties and to simplify the transmitting device, is a further purpose of this invention in that I provide a single line of connections between the engine and the motor-dynamo and have the transmitter capable of transmitting speed at different ratios according to which way power is being transmitted and further in such a device to have the ratio of speed transmitted to the dynamo variable and automatically varied according to the need or adjustment.

Figure 1 of the drawing represents partly in diagrammatic form and partly as a sectional view a device embodying my invention. Fig. 2 shows a modified form of my invention.

Fig. 3 is a side elevation of an engine and motor-dynamo connected by my device mounted on an intermediate shaft.

For the purpose of complete illustration of the operation of the transmitter the prime mover 5 may be assumed to be an internal explosive engine driving a shaft 6 upon which is fixed a sprocket wheel 7 from which by means of chain 8 motion is transmitted to sprocket wheel 9 loosely mounted on transmitter shaft 10 adjacent to a collar 11 fixed on said shaft and provided on one side with a friction surface 12 adapted to engage one side of the sprocket wheel 9. Upon the other side of the sprocket wheel 9 is another friction surface 13 of a collar 14 also mounted upon the transmitter shaft 10 and allowed a small amount of movement longitudinally thereon and a partial rotation thereon which movements are limited by the engagement of a lug 15 projecting from the transmitter shaft 10 into a recess 16 upon the hub 17 of the collar 14. The recess 16 has one of its lug-engaging sides 18 a slanting or cam surface so that when the transmitter shaft 10 is rotated in the direction indicated by the arrow thereon, the lug 15 will tend in an obvious manner to force the collar longitudinally of the shaft 10 toward the sprocket wheel 9 so that said sprocket wheel will be held between the friction surfaces 12 and 13 with sufficient grip to transmit to the said sprocket the rotating movement of said shaft 10, it being understood that an initial pressure of the collar on friction surface 13 against the sprocket wheel 9, is produced by a spring 20 coiled about the transmitter shaft 10 and tensioned to force the collar 14 toward the sprocket wheel 9. This pressure from spring 20 is adjusted by a nut 21 screwed onto the transmitter shaft 10. This pressure of the collar friction surface 13 against the sprocket wheel 9 while being such as will enable the lug 15 to become locked against the cam surface 18 of the recess 16 when the shaft 10 is driving the sprocket wheel 9, may be so adjusted that, when the sprocket wheel 9 is the driving element, the shaft 10 will not be moved at all or will not be moved when its resistance is greater than a predetermined amount. It will be evident that when the transmitter so far described is being used with the sprocket wheel 9 as the driving element, traveling of course in the same direction as before, the pressure from spring 20 will be sufficient to hold the collar 14 against the wheel 9 until the straight side 19 of the recess 16 engages the lug 15. Then the transmitter is not locked but has the collar 14 free to move longitudinally of the shaft within the limit allowed by lug 15 in the deepest part of the recess 16, except as the pressure from spring 20 may be adjusted to hold the wheel 9 between the collars 11 and 14 until a given resistance is encountered. However I prefer to have the adjustment of pressure from spring 20 such that, even when the wheel 9 is the driving member, it will be held between the collars 11 and 14 with sufficient grasp to transmit the entire movement to shaft 10 and then to provide controlling means to retract the collar 14 against the pressure of spring 20 and so control in any predetermined manner the speed transmitted to the driven member.

As such means of so controlling the movable friction member viz collar 14, I prefer to employ an electro-magnet 22 operating when its coil 23 is energized to attract the collar 14 which is of magnetic material.

Where as in Fig. 1 an electric generator 24 is driven from shaft 10, connection may be made from its brushes 25 and 26 by leads 27 and 28 to the coil 23 of the electro-magnet 22 whereby a steady output from the generator may be obtained for use on its outside circuit. By proper adjustment of these parts as soon as the generator reaches its predetermined output upon a minimum speed of the prime mover, the transmitter will operate to transmit only enough speed to the generator to maintain its desired output, in that the electro-magnet will be energized sufficiently to begin to counteract the pressure of the spring 20 as soon as the desired output begins to be reached and will become more active as the output increases until the spring pressure is sufficiently overcome to cause a slippage at the friction member and so reduce the speed and so the output.

It will be obvious that the device now described as used to obtain a steady speed or output of the electric generator, may be used where the generator is not the main load carried but primarily a regulating means to obtain not greater than a predetermined speed of the main load carried which may be designated by the pulley 29 driven from shaft 10.

A further advantageous application of my device is to employ it to connect two movable members so that the first may drive the second at a predetermined ratio varying as needed as heretofore described, while the second when it becomes the driving member, will drive the first without slippage at a different ratio. An example of such use is that of having the prime mover an internal combustion engine 5 connected by one of my transmitters to the generator as hereinbefore described which may be connected electrically to the electro-magnet 22 either by coil 23 alone or by such a coil and a supplemental coil 30 arranged to act either differentially or accumulatively and producing the various forms of regulation of the generator and its output as hereinbefore described and using the current so generated for ignition, lights 32, charging storage battery 33 or for any other purpose desired. This generator 24 may be used as a motor, receiving its current as from storage battery 33, to start the prime mover or explosive engine 5. The transmitter so used will at an effective ratio for such work transmit without slippage the full power of the motor, in that the initial pressure from coil spring 20 will be such as to cause the sprocket wheel 9 through the action of lug 15 upon the cam surface 18 to be securely locked between the collars 11 and 14 and the electro-magnet will not under these circumstances be effective. As soon as the engine has been started and attains a minimum speed, which of course exceeds that at which the engine will be driven by the motor, the speed from the engine given to sprocket wheel 9 overtakes the speed of shaft 10 from the motor, and unlocks the lug 15 from the cam face 18 and the engine then begins to drive the motor as an electrical generator and the transmitter through the action of its electro-magnet becomes operative to transmit only such a fractional part of the full movement of the driving member as is needed to obtain the desired result from the generator.

It is obvious that many combinations are possible with the shunt and series coils of the electro-magnet to produce various characteristics of the output of the electric generator.

The series coil 30 may be wound accumulative upon the electro-magnet 22 so that its effect is added to the shunt coil 23 instead of neutralizing it. As the load on the generator increases, this arrangement of accumulative coils will have the effect of causing an increase of slippage at a greater ratio than that caused by the coil 23, preventing a possible overload of the generator.

In Fig. 2 is shown a modification of my transmitter as heretofore described, in that in place of the current, which controls the action of the electro-magnet, being produced by a generator operated by the driven member of the transmitter, the current is taken from an independent source such as battery 35 and the regulation of the action of the electro-magnet is obtained by varying the current so supplied by means of a speed-controlled electrical contact coöperating with the driven member. As means for such an arrangement there is placed in such circuit a pivoted arm 36 mounted to rotate with the driven member 10 and when so rotated above a given speed to be thrown outwardly by centrifugal force against the normal restraint of spring 37 into contact with a contact plate 38 of carbon or other suitable material adapted to give an electrical resistance varying with the degree of pressure from the movable arm 36. It will be obvious that in this way the amount of current will be controlled by the speed of the driven member and so the amount of slippage of the friction members through the action of the electro-magnet energized by this current.

There are numerous other arrangements by which the current supplied to electro-magnet 22 can be made to vary with the speed of driven member 10 without departing from the principle involved in my invention as set forth hereinafter in the claims.

Fig. 3 shows a convenient arrangement for using my transmitter to connect an internal-combustion engine 5 with a motor-dynamo 24 by connecting the relatively large sprocket wheel 7 on the engine shaft 6 by chain 8 to small sprocket wheel 39 mounted on an intermediate shaft such as the common fan shaft 40. Mounted to rotate with wheel 39 is the fixed friction member 11 adapted to make frictional contact with the friction faced sprocket wheel 9 by longitudinal motion of another member 14 under the action of spring 20 controlled by electro-magnet 22 in any of the ways herein named. The relatively large sprocket wheel 9 is then connected by chain 41 to small sprocket 42 mounted on the shaft of the motor-dynamo 24. It is obvious that this arrangement will allow an effective ratio of say fifteen or twenty to one for the motor to drive the engine and when the engine is driving, the fan will be operated at necessary speed while by the controlled slippage of sprocket 9 only such power will be transmitted to the dynamo as is needed.

It is evident that my device is not limited to use upon a motor dynamo shaft as in Figs. 1 and 2 and upon an intermediate shaft as in Fig. 3, but may be readily applied if desired to what is normally the driving member, the driven member or any intermediate member in a great variety of ways which will be within the spirit and scope of my invention.

In Fig. 2 is illustrated a further modification of my invention in that instead of having the electro-magnet 22 stationary after being properly adjusted, it is yieldingly supported upon the bracket 43 as by coil springs 44 interposed between the head of screws 45 passing loosely through bracket 43 and adjustably screw-threaded into ears 46 upon the electro-magnet so that by the tension of springs 44 the electro-magnet 22 is normally held back from collar 14 but may be moved toward the collar upon the tension of springs 44 being overcome. Springs 45 being weaker than main spring 20, upon the electro-magnet being energized sufficiently to have its pull against the collar 14 overcome the tension of springs 44, the electro-magnet moves the limit of its motion toward but not to collar 14, but its electro-magnetic force having been rendered much more effective by its approach to the collar, the electro-magnet then exerts a sufficient pull upon the collar 14 to somewhat reduce the tension of main spring 20 and so reduce the pressure of the friction members until the consequent loss of speed operates to reduce the electric current sufficiently to allow the electro-magnet to resume its former position and the spring 20 to again exert greater pressure upon the friction members. These steps are repeated as often as necessary, to keep the transmitter imparting only as much power as is needed according to the adjustment. The advantages of so movably mounting the electro-magnet, are that the device will operate much quicker and be capable of much finer adjustment or balance.

What I claim as new and desire to secure by Letters Patent is:

1. In a power transmitting device, two movable members, means adapted to give a positive drive from the first member to the second and a drive with controllable slippage when the second member is driving the first member.

2. In a power transmitting device, two movable members, a single series of means adapted to give a positive drive from the first member to the second and a drive with controllable slippage when the second member is driving the first member.

3. In a power transmitting device, two movable members, means adapted to drive the second from the first at a fixed ratio and to drive the first from the second with a controllable slippage.

4. In a power transmitting device, two movable members, a single series of means adapted to drive the second from the first at a fixed ratio and to drive the first from the second with a controllable slippage.

5. In a two-way power transmitting device, means adapted to give a positive drive from one end of the device and a controllable slippage when said end is driven.

6. In a two-way power transmitting device, a single series of means adapted to give a positive drive one way and a controllable slippage when driving from the other way.

7. A transmitter gearing giving connection from a motor-dynamo to an internal combustion engine at a fixed ratio, and permitting a controllable slippage when the engine drives the motor-dynamo as a generator.

8. In a power transmitting device between an internal combustion engine and a motor-dynamo, connections adapted to give a positive drive from motor to engine and a controlled drive from engine to dynamo.

9. In a power transmitting device between an internal combustion engine and a motor-dynamo, a single series of connections adapted to give a positive drive from motor to engine and a controlled drive from engine to dynamo.

10. In a power transmitting device between an internal combustion engine and a motor-dynamo, connections adapted to drive the engine from the motor at a fixed ratio and permitting a controllable slippage when the engine drives the dynamo.

11. In a power transmitting device between an internal combustion engine and a motor-dynamo, a single series of connections adapted to drive the engine from the motor at a fixed ratio and permitting a controllable slippage when the engine drives the dynamo.

12. In a transmitter, members adapted to be brought into frictional contact, yielding means normally holding said friction members in contact, and locking members adapted to be brought into engagement and lock said friction members together when power is being transmitted through the device in one direction and to disengage when power is transmitted in the reverse direction.

13. In a transmitter, members adapted to be brought into frictional contact, yielding means normally holding said friction members in contact, locking members adapted to be brought into engagement and lock said friction members together when power is being transmitted through the device in one direction and to disengage when power is transmitted in the reverse direction and electrically operated means located and adapted to reduce the pressure of said friction members when the power is being transmitted in the said reverse direction.

14. In a transmitter, members adapted to be brought into frictional contact, yielding means normally holding said friction members in contact, locking members adapted to be brought into engagement and lock said frictions members together when power is being transmitted through the device in one direction and to disengage when power is transmitted in the reverse direction and electrically operated means located and adapted when energized to reduce the pressure of said friction members when the power is being transmitted in the said reverse direction according to the speed of the driven member.

15. In a transmitter, members adapted to be brought into frictional contact, yielding means normally holding said friction members in contact and electrically operated means adapted to reduce the pressure of said friction members, said pressure reducing means being movably mounted to automatically vary its power.

16. In a transmitter, members adapted to be brought into frictional contact, yielding means normally holding said friction members in contact and electrically operated means adapted to reduce the pressure of said friction members, said pressure reducing means being yieldingly supported to automatically vary its power.

17. In a transmitter, members adapted to be brought into frictional contact, yielding means normally holding said friction members in contact and electrically operated means adapted to reduce the pressure of said friction members, said pressure reducing means being yieldingly supported and adapted to automatically increase its power when moved from normal position.

18. In a transmitter, members adapted to be brought into frictional contact, yielding means normally holding said friction members in contact and electrically operated means adapted to reduce the pressure of said friction members, said pressure reducing means being normally yieldingly spaced from its coöperating member and adapted to be automatically moved nearer thereto when sufficiently energized and exert greater force thereupon.

19. In a transmitter, members adapted to be brought into frictional contact, yielding means normally holding said friction members in contact and electrically operated means adapted to reduce the pressure of said friction members, said pressure reducing means being automatically movable to positions of varying power.

20. In a transmitter, members adapted to be brought into frictional contact, yielding means normally holding said friction members in contact and electrically operated means adapted to reduce the pressure of said friction members, said pressure reducing means being automatically movable to positions of varying power and adapted to be moved to greater-power-exerting position when sufficiently energized.

In witness whereof I have affixed my signature, in the presence of two witnesses, this 7th day of December, 1912.

MONTGOMERY H. JOHNSON.

Witnesses:
HARRIET WILLIAMS,
ETHEL BUTTERWORTH.